US009269525B2

(12) United States Patent
Mueller et al.

(10) Patent No.: US 9,269,525 B2
(45) Date of Patent: Feb. 23, 2016

(54) PROCESS FOR PRODUCING A HIGH-TEMPERATURE-RESISTANT COMPOSITE BODY (71) Applicant: PLANSEE SE, Reutte (AT)

(72) Inventors: Thomas Mueller, Hoefen (AT); Klaus Ennemoser, Waengle (AT); Wolfgang Glatz, Reutte (AT); Andreas Menhard, Hoefen (AT)

(73) Assignee: Plansee SE, Reutte (AT)

( * ) Notice: Subject to any disclaimer, the term of this patent is extended or adjusted under 35 U.S.C. 154(b) by 65 days.

(21) Appl. No.: 14/360,706

(22) PCT Filed: Nov. 22, 2012

(86) PCT No.: PCT/AT2012/000296
§ 371 (c)(1),
(2) Date: May 27, 2014

(87) PCT Pub. No.: WO2013/075155
PCT Pub. Date: May 30, 2013

(65) Prior Publication Data
US 2014/0334606 A1    Nov. 13, 2014

(30) Foreign Application Priority Data

Nov. 25, 2011   (AT) ............................. GM640/2011 U (51) Int. Cl.
*H01J 35/10*       (2006.01)
*H01J 1/44*        (2006.01)
(Continued)

(52) U.S. Cl.
CPC ............. *H01J 35/108* (2013.01); *B23K 35/005* (2013.01); *B23K 35/32* (2013.01); *B23K 35/325* (2013.01);
(Continued)

(58) Field of Classification Search
CPC ........... H01J 35/00; H01J 35/02; H01J 35/04; H01J 35/08; H01J 35/10; H01J 35/105; H01J 35/108; H01J 2235/00; H01J 2235/08; H01J 2235/081; H01J 2235/083–2235/085; H01J 1/00; H01J 1/36; H01J 1/38; H01J 1/44; H01J 9/00; H01J 9/02; B32B 15/00; B32B 15/04; B32B 15/043; B23K 35/00; B23K 35/001; B23K 35/005; B23K 35/22; B23K 35/24; B23K 35/32; B23K 35/325; B23K 35/36; B23K 31/00; B23K 31/02; H05G 1/00; H05G 1/02; C22C 14/00; C22C 16/00; C22C 27/00; C22C 27/02; C22C 27/025; C22C 27/04; C22C 30/00
USPC ................. 378/119, 121, 125, 127, 143, 144; 29/592, 428, 469; 228/101, 120, 122.1, 228/124.1, 227, 262.1, 262.7, 262.71, 228/262.72, 262.8, 262.9; 428/544, 545, 428/615, 621, 634, 655, 660–663, 665, 687
See application file for complete search history.

(56) References Cited

U.S. PATENT DOCUMENTS 5,102,747 A     4/1992  Kneringer
5,159,619 A  *  10/1992  Benz ..................... H01J 35/105
                                                         378/127
(Continued)

FOREIGN PATENT DOCUMENTS

AT              6994 U1          7/2004
DE       GB 1383557    *    3/1972  ............ H01J 35/108
(Continued)

*Primary Examiner* — Anastasia Midkiff
(74) *Attorney, Agent, or Firm* — Laurence A. Greenberg; Werner H. Stemer; Ralph E. Locher (57) ABSTRACT

A high-temperature-resistant composite body is formed by joining over an area of a first, nonmetallic section via a bonding solder layer to a second, metallic section composed of Mo, an Mo-based alloy, W or a W-based alloy. A first arrangement composed of the first section, a first Zr solder and an intermediate layer is firstly soldered together in a first soldering step. A second arrangement of the resulting partial composite body, a second solder adjoining the intermediate layer and the second section is subsequently soldered together in a second soldering step. The intermediate layer at least 90 atom % of at least one of the elements Ta, Nb, W. The second solder is formed by precisely one material selected from Ti, Ti-based solder combination, V-based solder combination, Zr or Zr-based solder combination and it melts at a lower temperature than the first Zr solder in the second arrangement.

15 Claims, 3 Drawing Sheets

(51) Int. Cl.
  *H01J 1/36*  (2006.01)
  *B23K 35/32*  (2006.01)
  *B23K 35/00*  (2006.01)
  *B23K 1/19*  (2006.01)
  *C04B 37/02*  (2006.01)
  *B23K 1/00*  (2006.01)

(52) U.S. Cl.
  CPC . *H01J 1/44* (2013.01); *H01J 35/10* (2013.01); *B23K 1/0008* (2013.01); *B23K 1/19* (2013.01); *B23K 2203/16* (2013.01); *C04B 37/026* (2013.01); *C04B 2235/6562* (2013.01); *C04B 2235/6581* (2013.01); *C04B 2235/661* (2013.01); *C04B 2237/122* (2013.01); *C04B 2237/126* (2013.01); *C04B 2237/127* (2013.01); *C04B 2237/36* (2013.01); *C04B 2237/363* (2013.01); *C04B 2237/365* (2013.01); *C04B 2237/366* (2013.01); *C04B 2237/368* (2013.01); *C04B 2237/38* (2013.01); *C04B 2237/385* (2013.01); *C04B 2237/403* (2013.01); *C04B 2237/52* (2013.01); *C04B 2237/55* (2013.01); *C04B 2237/62* (2013.01); *C04B 2237/708* (2013.01); *C04B 2237/72* (2013.01); *H01J 1/36* (2013.01); *H01J 2235/083* (2013.01)

(56) References Cited

U.S. PATENT DOCUMENTS

| | | |
|---|---|---|
| 7,762,448 B2 | 7/2010 | Roedhammer |
| 2002/0085678 A1 | 7/2002 | Warren |
| 2003/0006269 A1* | 1/2003 | Horner ................ C04B 35/5622 228/122.1 |
| 2007/0071174 A1* | 3/2007 | Hebert .................. H01J 35/101 378/144 |
| 2011/0103553 A1 | 5/2011 | Nitta et al. |

FOREIGN PATENT DOCUMENTS

| | | |
|---|---|---|
| EP | 0464916 A2 | 1/1992 |
| JP | 2010140879 | 6/2010 |
| WO | 2005034168 A1 | 4/2005 |

* cited by examiner

PROCESS FOR PRODUCING A HIGH-TEMPERATURE-RESISTANT COMPOSITE BODY

BACKGROUND OF THE INVENTION

Field of the Invention

The present invention relates to a process for producing a high-temperature-resistant composite body and also a high-temperature-resistant composite body in which a first, non metallic section is joined via a bonding solder layer to a second, metallic section composed of Mo, an Mo-based alloy, W or a W-based alloy.

Such high-temperature-resistant composite bodies are to be provided, in particular, for the production of rotary X-ray anodes. Rotary X-ray anodes are used in X-ray tubes for generating X-rays. X-ray instruments having such rotary X-ray anodes are used, in particular, in the medical field in imaging diagnostics. In use, electrons are emitted from a cathode of the X-ray tube and accelerated in the form of a focused electron beam onto the rotating X-ray anode. A major part of the energy of the electron beam is converted into heat in the rotary X-ray anode, while a smaller part is radiated as X-ray radiation. The rotation of the rotary X-ray anode counters local overheating.

Owing to the high thermal stresses, the base material of rotary X-ray anodes is generally made of a high-melting material which should additionally have a good thermal conductivity in order to remove heat. In addition, it should provide a sufficient mechanical stability even at high temperatures and at high rotational speeds. Suitable materials for the base material are, in particular, molybdenum and molybdenum-based alloys (e.g. TZM, MHC), with tungsten or tungsten-based alloys also being possible. The term MHC refers in this context to a molybdenum alloy which has an Hf content of from 1.0 to 1.3% by weight (Hf: hafnium), a C content of 0.05-0.12% by weight, and an O content of less than 0.06% by weight, with the balance (apart from impurities) being molybdenum. In order to ensure effective radiation of heat, radiative bodies made of a non metallic material which are joined to the base body over its area (in general by soldering) are sometimes provided on the rear side of the base body of rotary X-ray anodes. A suitable material for the radiative body is, in particular, graphite which has good radiative characteristics, heat resistance and a low weight. When the rotary X-ray anodes are to be designed for high radiation outputs, the strength of the base body of the rotary X-ray anodes and the stability and longevity of the bond to the radiative body have to meet particularly demanding requirements because of the high temperatures, the high temperature gradients and the high mechanical stresses (owing to the high rotational speeds).

As is known in the technical field, a particularly high strength of Mo, Mo-based alloys (e.g. TZM, MHC), W and W-based alloys can be achieved by forming (e.g. forging). If these are heated to above their recrystallization temperature after the forming step, their strength is reduced (thermal ageing). Accordingly, it has to be ensured in the production of rotary X-ray anodes that excessive heating does not occur after the forming step in order to minimize thermal ageing of the base body. On the other hand, the soldered bond between base body and radiative body has to be produced using solders which ensure satisfactory stability even at the high use temperatures. In addition, the soldered bond has to meet the requirement that it withstands mechanical stresses which occur between the two parts being joined. Such mechanical stresses, which have force components acting, in particular, in the plane of the soldered bond, arise, in particular, as a result of different coefficients of thermal expansion of the two parts being joined, as a result of the high temperature gradients which occur and/or as a result of the forces which act because of the rotation.

In the field of rotary X-ray anodes, different concepts which address a comparable problem in respect of a bond over an area which is necessary between a non metallic section and a metallic section composed of Mo, an Mo-based alloy, W or a W-based alloy are being and have been developed. Furthermore, comparable problems for such a bond over an area also occur in X-ray anodes generally (e.g. static anodes) and also sometimes in high-temperature-resistant composite bodies in general composed of the abovementioned materials.

US 2002/0085678 A1 describes a process for joining a molybdenum alloy substrate having a graphite plate to a rotary X-ray anode, in which, in a first step, a molybdenum alloy sheet is soldered by means of a pure metal solder to the graphite plate and, in a second step, the plated graphite substrate is soldered to the molybdenum alloy substrate using a specific solder alloy. Suitable solder alloys are said to be, in particular, a Ti—Cr—Be alloy (titanium-chromium-beryllium alloy) and a Ti—Si alloy (titanium-silicon alloy).

US 2011/0103553 A1 describes a process for producing an X-ray anode, in which a first solder layer comprising an Nb—Ti alloy, a second solder layer comprising Nb or an Nb alloy and a third solder layer comprising Zr are arranged starting from a base material comprising molybdenum or a molybdenum alloy towards a carbon base material and this arrangement is soldered in one step at a temperature in the range from 1730° C. to 1900° C. JP 2010-140879 A describes a process for producing an X-ray anode, in which a first solder layer composed of a Ta—Ti alloy, a second solder layer composed of Ta or a Ta alloy and a third solder layer composed of Zr are arranged starting from a base material composed of molybdenum or a molybdenum alloy towards a graphite base material and this arrangement is soldered in one step at a temperature in the range from 1750° C. to 1900° C. Both in US 2011/0103553 A1 and in JP 2010-140879 A, the second solder layer is in each case provided in order to avoid diffusion of Zr and Mo. In the first solder layer, the material of the second solder layer (Nb or Ta) is alloyed with Ti in order to set the melting point of the first solder layer between the comparatively high melting point of the second solder layer and the comparatively low melting point of pure Ti.

BRIEF SUMMARY OF THE INVENTION

Accordingly, it is an object of the present invention to provide a high-temperature-resistant composite body and a process for producing such a high-temperature-resistant composite body, in which a first, non metallic section is joined via a soldered bond to a second metallic section composed of Mo, an Mo-based alloy, W or a W-based alloy, where firstly thermal ageing of the metallic section is largely prevented and secondly the soldered bond withstands high temperatures, high temperature gradients and high mechanical stresses between the two sections.

The object is achieved by a process as claimed and by a high-temperature-resistant composite body as claimed. Advantageous embodiments of the invention are indicated in the dependent claims.

The present invention provides a process for producing a high-temperature-resistant composite body by joining over an area of a first, non metallic section via a bonding solder layer to a second, metallic section composed of Mo (Mo: molybdenum), an Mo-based alloy, W (W: tungsten) or a W-based alloy. The process comprises the following steps:

A) production of a first arrangement of the first section, a first Zr solder (Zr: zirconium) and an intermediate layer in this order,
   where the intermediate layer is formed to an extent of at least 90 atom % of at least one of the elements Ta (Ta: tantalum), Nb (Nb: niobium) and/or W,
B) heating of the first arrangement in a first soldering step in such a way that the Zr solder but not the intermediate layer melts and a part composite body is obtained,
C) production of a second arrangement of the part composite body, a second solder adjoining the intermediate layer and the second section in this order, where the second solder is formed by precisely one material from the group consisting of Ti, Ti-based solder combination, V-based solder combination, Zr or Zr-based solder combination and is selected so that it melts at a lower temperature than the first Zr solder in the second arrangement, and
D) heating of the second arrangement in a second soldering step in such a way that the second solder but not the soldered bond obtained from the first Zr solder melts.

The present invention further provides a high-temperature-resistant composite body which has been produced by the process of the invention. Furthermore, one or more of the variants and embodiments discussed below can also be realized in the process of the invention.

The use of the first Zr solder results in good adhesion to the first, nonmetallic section which is formed, in particular, by a carbon-based material (e.g. graphite). The intermediate layer composed of the abovementioned materials Ta, Nb and/or W, which has a high melting point and accordingly does not melt during the two soldering steps, effectively prevents diffusion of elements through the intermediate layer. In particular, if the first section is formed by a carbon-based material, diffusion of carbon into the second, metallic section (e.g. composed of Mo or an Mo alloy) is prevented. Furthermore, the intermediate layer prevents, if the second metallic section is formed by Mo or an Mo-based alloy, mixing of Zr from the first Zr solder and of Mo from the second section occurring as a result of diffusion and a eutectic being formed. The formation of such a eutectic having a comparatively low melting point is undesirable, particularly in the case of composite bodies which are designed for high use temperatures.

As a result of the second solder selected being a material which in the second arrangement melts at a lower temperature than the first solder, the second soldering step can be carried out at a lower temperature than the first soldering step. The solder materials claimed for the second solder have (either alone or in combination with the adjoining, second section) a low melting point and are particularly suitable for producing a load-bearing bond between the intermediate layer and the second, metallic section. Since the second, metallic section is heated (to a comparatively low temperature) only when carrying out the second soldering step, thermal ageing of the second section is largely avoided. This is particularly advantageous when the second section and/or a section firmly joined thereto consist(s) of a formed material.

Furthermore, it is advantageous in the process of the invention that the three-layer (or optionally also multilayer) bonding solder layer produces a bond by means of which stresses occurring between the first and second sections are effectively dissipated. This dissipating effect is achieved particularly when Ta and/or Nb are used as material for the intermediate layer. Here, particular preference is given to the intermediate layer being formed to an extent of at least 90 atom % by Ta and/or Nb, in particular to an extent of at least 90 atom % by Ta alone or to an extent of at least 90 atom % by Nb alone. This is because in the case of these materials the intermediate layer has elastic and sometimes plastic properties at the use temperature and thus effectively dissipates stresses occurring between the two sections and sometimes also heals cracks formed in the adjoining solder layers. The intermediate layer is preferably formed to an extent of at least 99 atom % by Ta and/or Nb, in particular to an extent of at least 99 atom % by precisely one element, i.e. Ta alone or Nb alone. Nb is advantageous because it is cheaper and lighter. The elastically plastic properties are particularly pronounced when the intermediate layer is formed by essentially only one element having a very high purity. On the other hand, a higher strength of the intermediate layer can be obtained in a targeted manner by alloying in further elements (for example up to 10 atom %, in particular up to 5 atom %). If an intermediate layer composed of W (i.e. to an extent of at least 90 atom %, in particular to an extent of at least 99 atom %) is used, this forms an effective diffusion barrier and displays a high strength which is maintained to a high degree even at high use temperatures.

As indicated at the outset, the process of the invention is particularly suitable for joining a metallic base body composed of Mo, an Mo-based alloy (in particular TZM or MHC), W or a W-based alloy to a non metallic radiative body made, in particular, of graphite in the production of a rotary X-ray anode. It is particularly suitable for joining a base body composed of TZM (or optionally a different, Mo-based alloy such as MHC,) to a radiative body composed of graphite. However, in the past and in future development, other materials combinations have also been/will also be possible for the first and the second section in the field of rotary X-ray anodes. This is because, in particular, other materials will be used for the base body and/or for the radiative body (e.g. pure Mo, W or W-based alloys for the base body; carbon fibre-reinforced carbon or carbon fibre-reinforced silicon carbide for the radiative body), because other components of a rotary X-ray anode will be joined by the process of the invention (e.g. in the region of the stem of a rotary X-ray anode) or because other concepts will be developed for realizing the rotary X-ray anode. In the case of other concepts, developments involving (with a view to weight optimization) making, for example, the base body of the rotary X-ray anode of a C-based material (e.g. of a carbon fibre-reinforced carbon) or of a ceramic (e.g. silicon carbide (SiC), silicon nitride ($Si_3N_4$), aluminium nitride (AlN), boron carbide ($B_4C$), carbon fibre-reinforced silicon carbide (C—SiC) or silicon carbide fibre-reinforced silicon carbide (SiC—SiC)) and a focal track (e.g. of W or a W-based alloy, for example a tungsten-rhenium alloy) being soldered directly onto this, with the soldering process of the invention likewise being able to be employed for this join, are to be considered. As an alternative, a metallic joining section (e.g. composed of Mo or an Mo-based alloy, for example TZM or MHC) can also firstly be soldered onto such a non-metallic base body by means of the process of the invention in order then to apply the focal track (e.g. composed of W or a W-based alloy) to the joining section. Furthermore, the process of the invention can also be employed for joining such a non metallic base body to further, metallic joining partners, for example in the region of the stem.

Furthermore, the process of the invention can also be employed generally in the case of X-ray anodes (e.g. stationary anodes) in which, depending on the embodiment, a high-temperature-resistant bond between two sections composed of the appropriate materials can likewise be necessary. In addition, there are also applications beyond the field of rotary X-ray anodes in which two sections of in each case the stressed materials are to be joined to one another via a high-temperature-resistant bond and the process of the invention can accordingly be employed.

The expression Mo-based or W-based alloy refers to an alloy which comprises at least 50 atom % of Mo or W, respectively, in particular at least 90 atom % of Mo or W, respectively. In particular, the second, metallic section is formed by an Mo alloy, with TZM being an Mo alloy which has been found to be particularly useful in the field of rotary X-ray anodes. Furthermore, MHC is frequently also used. "Joining over an area" is independent of whether the surfaces to be joined are flat or curved. A "high-temperature-resistant composite body" refers to a composite body in which the soldered bond withstands, in particular, temperatures (prevailing locally at the soldered bond) in the range 1000-1600° C., where the first section and/or the second section can also be at higher temperatures during use (e.g. in the case of rotary X-ray anodes, temperatures up to 2500° C. are usual in the region of the focal track).

The term Zr solder (both in the case of the first solder and also in the case of the second solder) refers to a solder which consists essentially, in particular to an extent of at least 90 atom %, of pure Zr. Here, it has to be taken into account that Zr solders which are customarily used generally have a relatively high proportion of impurities or additives (e.g. Hf; Hf: hafnium) which are typically present in amounts of up to 5 atom %. For example, an Hf content of 2.35 atom % is usual. The expression "solder combination" refers both to the variant in which the elements concerned are already present as alloy or as finely mixed paste (metal powder with liquid binder phase) and to the variant in which the solder combination is formed by two or more foils or individual layers of differing composition, in particular by foils or individual layers of the respective individual elements. Furthermore, the (first or second) solder can, as is known in the technical field, be applied, inter alia, as foil, as metallic layer (applied by means of a coating process, e.g. CVD, plasma spraying, etc.) or as paste. As regards the second solder, a Ti-, V- or Zr-based solder combination refers to a solder which contains the element concerned, i.e. Ti, V or Zr, in a proportion of at least 50 atom %. The second solder is preferably formed by precisely one or at most two elements (apart from impurities or additives which can form a maximum proportion of 5 atom %). For the present purposes, a Ti solder is a solder which consists essentially, in particular to an extent of at least 95 atom %, of pure Ti. If a V-based or Zr-based solder combination is used as the second solder, the second (and preferably only further) constituent of the solder combination is preferably Ti. This results in a relatively low melting point of the second solder combination. The material selected for the second solder is, in particular within the claimed variants, a material which has a lower melting point than the first solder. This can, as is known to those skilled in the art, be determined with the aid of the binary or ternary phase diagrams. The second solder alone can optionally also have a higher melting point than, or identical melting point to, that of the first solder, with the lower melting point resulting only from contact with the second section and optionally also from contact with the intermediate layer, so that a melting point reduction occurs during soldering as a result of the diffusion which takes place and the second solder melts from the side of the contact area. This is the case, for example, for a Zr solder and a Zr-based solder combination which forms a eutectic having a lower melting point with Mo (from the second section). In the heat step during the second soldering step (step D)), heating is carried out only to a comparatively low temperature and/or for only a comparatively short time in order that only the second solder but not the first solder melts.

Both the first and the second section can optionally also be sections of a larger component or a larger assembly. The bonding solder layer of the invention is preferably formed by precisely the three layers (first solder, intermediate layer, second solder). There is in principle the possibility of further layers also being provided between the first section and the second section.

In a further embodiment, the maximum furnace temperature reached in the second soldering step is at least 100° C. lower than the maximum furnace temperature reached in the first soldering step. In this way, thermal ageing of the second section is effectively avoided. In particular, the temperature difference is in the range from 200° C. inclusive to 400° C. inclusive, as a result of which this advantageous effect is reinforced further. How high this temperature difference can be selected (or what minimum temperature has to be set in the respective soldering step) depends on the respective solders used. For the purposes of the present invention, "maximum furnace temperature" refers to the maximum furnace temperature reached on going through the temperature profile (which is usually maintained for a period of 5-10 minutes). In an embodiment, a maximum furnace temperature in the range from 1800° C. inclusive to 2000° C. inclusive, in particular in the range from 1900° C. inclusive to 1980° C. inclusive, is set in the first soldering step and a maximum furnace temperature in the range from 1550° C. inclusive to 1720° C. inclusive, in particular in the range from 1550° C. inclusive to 1650° C. inclusive, is set in the second soldering step. Depending on the solder materials for the second solder, maximum furnace temperatures in, for example, the region of 1620° C. (+/−10° C.), optionally also 1550° C. (+/−10° C.), are possible in the second soldering step. This maximum furnace temperature is preferably also maintained over a predetermined period of time, in particular in the range from 3 to 20 minutes, preferably in the range from 5 to 10 minutes. In general, it can then be assumed that the respective solder being melted essentially reaches this maximum furnace temperature.

In an embodiment, the material of the second solder is selected so that in the second arrangement it has a melting point in the range from 1550° C. inclusive to 1680° C. inclusive, in particular in the range from 1600° C. (e.g. Ti—V solder combination) to 1670° C. (e.g. Ti solder). As a result, the temperature in the second soldering step can be selected so as to be correspondingly low and thermal ageing of the second section is avoided. If the respective solder is formed by a solder combination, the melting point given by the solder composition concerned (according to the phase diagram) is in principle considered to be decisive regardless of the form in which this solder combination is present (e.g. as alloy, as paste, as separate foils, etc.). Even when the solder combination is present as separate foils, it can be assumed that this composition region is firstly established at the interface as a result of diffusion effects and the solder combination melts from the interface. In addition, depending on the solder and depending on the material which adjoins the solder, a melting point reduction can also occur in the region of this interface as a result of diffusion effects. In particular, in the case of a Zr solder and in the case of a Zr-based solder combination, it needs to be taken into account that it forms a eutectic in combination with Mo. Accordingly, a lower melting point (in general the melting point of the eutectic) than the melting point of the solder alone is obtained by contact of the solder with a section composed of Mo or an Mo-based alloy due to diffusion effects.

In an embodiment, the second solder is formed by precisely one of the following solders:
a Ti solder,
a Ti—V solder combination,
a Zr solder or
a Zr—Ti solder combination.

A particularly low melting point can be achieved by these solder combinations, as is described in detail below. Thermal ageing of the second, metallic section can largely be avoided thereby. The binary solder combinations in each case have complete solubilities in the liquid state, which is advantageous for carrying out soldering. Furthermore, these solders are particularly suitable for a reliable bond to the second, metallic section. These advantageous properties are achieved to a particular extent when the second solder is formed by a Ti—V solder combination. This is because the binary system of Ti and V has a melting point minimum, so that a melting point lower than that in the case of pure Ti can be achieved. In particular, the Ti—V solder combination has a proportion of from 12 atom % inclusive to 50 atom % inclusive of V, with the balance being Ti. The V content of the Ti—V solder combination is in particular in the range from 20 atom % inclusive to 40 atom % inclusive. Particular preference is given to a V content in the Ti—V solder combination of precisely 31 atom % or in the region of 31 atom % (e.g. +/−4 atom %), which corresponds to the melting point minimum of the binary system.

Furthermore, the process of the invention makes it possible for after-working of the (free) surface of the intermediate layer to be carried out after joining the intermediate layer to the first section. In an embodiment, the surface of the intermediate layer of the part composite body is worked mechanically and/or chemically after the first soldering step and before production of the second arrangement, with machining being particularly preferred. In this way, a stable intermediate layer can be used during the first soldering step (which is carried out at comparatively high temperatures). Accordingly, undesirable deformation or distortion, which can occur in the first soldering step, is effectively avoided. The intermediate layer can subsequently be reduced to a desired thickness or to a desired thickness profile. In particular, the local stress dissipating effect provided by the intermediate layer can be set in a targeted way. For example, a different thickness can be set in the region of the focal track than in the remaining regions. As an alternative or in addition, a desired structuring can also be introduced, for example to increase the adhesion of the second solder. In an embodiment, the surface of the intermediate layer of the part composite body is machined in such a way that it has at least two different levels after the first soldering step and before production of the second arrangement. For example, an annular depression having a constantly lower level can be machined into the intermediate layer in the case of a rotary X-ray anode. The level difference can, depending on the total thickness of the intermediate layer, be, for example, in the range from 0.2 to 0.8 mm. In particular, a step-like configuration of the at least one level difference is preferred. In this way, positive locking can also be provided in addition to an adhesive bond in the case of appropriate shaping of the area of the section of the second, metallic section to be joined, which can further increase the stability in use (in particular in the radial direction). In the latter case, preference is given to the at least one solder foil inserted between the intermediate layer and the second, metallic section also being appropriately divided into a plurality of part-solder foils in order to make a good engagement of the respective edges of the intermediate layer and of the second, metallic section possible.

In an embodiment, the average thickness of the intermediate layer is in the range from 100 μm inclusive to 2000 μm inclusive. Good results have been achieved at, in particular, layer thicknesses in the region of 600 μm, with this region (+/−50 μm) also being advantageous for cost reasons. When Nb and/or Ta are used as main constituent of the intermediate layer, it is advantageous, owing to the elastically plastic properties thereof at the use temperatures in question, for this intermediate layer to be comparatively thick (e.g. ranges of from 1200 μm inclusive to 2000 μm inclusive are also possible) in order to achieve a particularly good stress dissipating function between the first section and the second section. If working of the intermediate layer leading to removal of material is carried out after the first soldering step, the abovementioned thicknesses refer to the reduced (optionally average) layer thickness of the intermediate layer. A layer thickness of the intermediate layer before working is, in particular, correspondingly greater, for example in the range from 350 μm inclusive to 3000 μm inclusive. If working of the intermediate layer is carried out after the first soldering step, particularly good results can be achieved at (starting) layer thicknesses in the region of 1000 μm, with this region (+/−50 μm) also being advantageous for cost reasons. In general, when layer thicknesses (before or after soldering) are specified, these refer to a thickness measured along a cross section running perpendicular to the layer concerned (which cross section runs, in particular, along the radial direction in the case of rotary X-ray anodes). If the layer thickness varies over the cross section concerned, it is averaged, employing the arithmetic mean of a plurality of measurement points distributed uniformly over the layer profile along the cross section.

In an embodiment, the average thickness of the first solder is in the range from 80 μm inclusive to 500 μm inclusive, with thicknesses in the region of 250 μm (+/−50 μm) being particularly suitable. In an embodiment, the average thickness of the second solder is in the range from 30 μm inclusive to 400 μm inclusive, with thicknesses in the region of 180 μm (+/−50 μm) being particularly suitable. These thicknesses refer to the thicknesses before the soldering step (at least in the cases in which foils or coatings of the respective, pure solder materials are used); in the case of pastes, somewhat higher layer thicknesses, depending on the composition, can be obtained. After the soldering step, diffusion effects occur at least in the region of the interfaces.

In an embodiment, the first section is formed by a C-based material. Suitable materials are, in particular, graphite or a carbon fibre-reinforced carbon (CFC). In an embodiment, the first section is formed by a ceramic. Suitable ceramics are, in particular, silicon carbide (SiC), silicon nitride ($Si_3N_4$), aluminium nitride (AlN) and boron carbide ($B_4C$). In an embodiment, the ceramic is formed by a fibre-reinforced ceramic. Suitable fibre-reinforced ceramics are, inter alia, carbon fibre-reinforced and silicon carbide fibre-reinforced ceramics, in particular carbon fibre-reinforced silicon carbide (C—SiC) and silicon carbide fibre-reinforced silicon carbide (SiC—SiC). In a further embodiment, the second section is formed by Mo or an Mo-based alloy. As explained above, these are materials used, in particular, in the field of X-ray anodes. Particularly useful materials are, in particular, graphite for the first section and an Mo-based alloy (in particular TZM or MHC) for the second section. In an embodiment, both the first section and the second section form respective sections of components of an X-ray anode, in particular a rotary X-ray anode. In particular, as indicated above, the first section is formed by a radiative body and the second section is formed by a base body of a rotary X-ray anode. As indicated above, the process of the invention is also suitable for joining other components of a rotary X-ray anode. Furthermore, the process of the invention can also be used in realizing other concepts of rotary X-ray anodes in so far as corresponding sections on a rotary X-ray anode or adjoining components are to be joined.

The present invention further provides a high-temperature-resistant composite body in which a first, non metallic section is joined via a bonding solder layer to a second, metallic section composed of Mo, an Mo-based alloy, W or a W-based alloy. Here, the first section is joined via a first soldered bond formed by a Zr solder to an intermediate layer which at least in a core region is formed to an extent of at least 90 atom % by at least one of the elements Ta, Nb and/or W. The intermediate layer is in turn joined via a second soldered bond formed by a Ti solder, a Ti—V solder combination, a Zr solder or a Zr—Ti solder combination to the second section. The high-temperature-resistant composite body according to the invention achieves essentially the same advantages as the process of the invention. As described above, the abovementioned solder materials (Ti solder, Ti—V solder combination, Zr solder or Zr—Ti solder combination), in particular, make it possible for a comparatively low soldering temperature to be required for realizing the second soldered bond due to their low melting point. Accordingly, if the soldering process is carried out in two stages, thermal ageing of the metallic section is largely avoided. In particular, the metallic section within the composite body has a high strength since it has not been reduced, or been reduced only slightly, during the second soldering step. Furthermore, statistical evaluation of second sections of the composite bodies according to the invention indicates that these have, owing to the lower soldering temperature during the second soldering step, a higher average flexural strength, and furthermore the statistical width of the distribution (of the values of the flexural strength) is narrower than when a uniform soldering step at a maximal (higher) soldering temperature necessary to melt the Zr solder is carried out. Both the higher values of the flexural strength and also the narrow distribution curve are advantageous particularly when a desired, relatively high strength of the second, metallic section within the composite body is to be provided in the production process.

The feature that the respective soldered bond is formed by one of the solders mentioned refers to an embodiment in which the solder for producing the bond between the respective section and the intermediate layer is formed exclusively by the solder materials mentioned. However, it has to be taken into account that diffusion occurs during soldering and accordingly, in particular, materials from the intermediate layer and from the respective section are present within the solder layer (after the respective soldering step). Furthermore, the first and/or second section and/or the intermediate layer can also be provided with a coating (e.g. CVD coating, PVD coating, plasma spray coating etc.) which serves, for example, as diffusion barrier or for protection of the respective section. However, preference is given to the solder in each case directly adjoining the base material of the first and/or second section and also the base material of the intermediate layer.

Particularly when using Ti solder and Ti—V solder combinations and sometimes also Ti-based solder combinations in general, an advantageous effect is that these have a comparatively low melting point. A further advantage is that material from the adjoining intermediate layer and material from the adjoining second section diffuse into the solder layer in the (second) arrangement of the composite body while carrying out the second soldering step. In the case of these solders, this diffusion leads to a melting point increase in the case of the materials coming into question here. This leads to the material of the solder layer solidifying from the interfaces adjoining the second section and the intermediate layer towards the middle of the solder layer when carrying out soldering (at moderate temperatures). This progressive solidification is advantageous for the structure of the solder layer. Furthermore, it is advantageous, particularly in the case of applications at relatively high use temperatures, that the remelting temperature of the second soldered bond is higher than the melting point of the pure, second solder. The higher the soldering temperature and/or duration of the second soldering step, the more strongly pronounced are the diffusion effects and accordingly the remelting temperature is correspondingly increased further. As a result of the second soldering step preferably being carried out at comparatively low temperatures, the diffusion effects are relatively small, for example compared to a uniform soldering step as described in US 2011/0103553 A1 and JP 2010-140879 A. Accordingly, a feature characterizing the second soldered bond, which is attributable to the comparatively low temperatures during the second soldering step, is the comparatively low remelting temperature for the solder used in each case.

In an embodiment, the second soldered bond is formed by a Ti solder having a remelting temperature of not more than 1860° C. In particular, the remelting temperature is in the range from 1740° C. to 1790° C. inclusive. In an embodiment, the second soldered bond is formed by a Ti—V solder combination having a remelting temperature of not more than 1780° C. In particular, the remelting temperature is in the range from 1650° C. inclusive to 1700° C. inclusive. The values relate to a composite body in the new state (i.e. after carrying out soldering). This is because further diffusion occurs during use at high temperatures and would lead to a further increase in the remelting temperature. The applicable method of measurement for determining the remelting temperature is explained below with reference to the figures.

Suitable ranges for the average thicknesses of the first soldered bond, of the core region of the intermediate layer and of the second soldered bond within the (soldered) high-temperature-resistant composite body in each case correspond to the values indicated above for the average thicknesses of the first solder, of the intermediate layer and of the second solder. While carrying out the soldering steps, the above-described diffusion effects occur in the region of the interfaces. As interface of a layer or a section in the soldered state, the area, in particular, in which the concentration of the material of the layer concerned or of the section concerned has dropped to 90 atom % is selected. Furthermore, it has to be taken into account that part of the solder can exit at a peripheral region while carrying out the soldering step. Accordingly, these effects have to be taken into account when a particular thickness of a layer is desired in the soldered, high-temperature-resistant composite body.

Further advantages and useful aspects of the invention can be derived from the following description of examples with reference to the accompanying figures.

DESCRIPTION OF THE INVENTION

Figure 1:
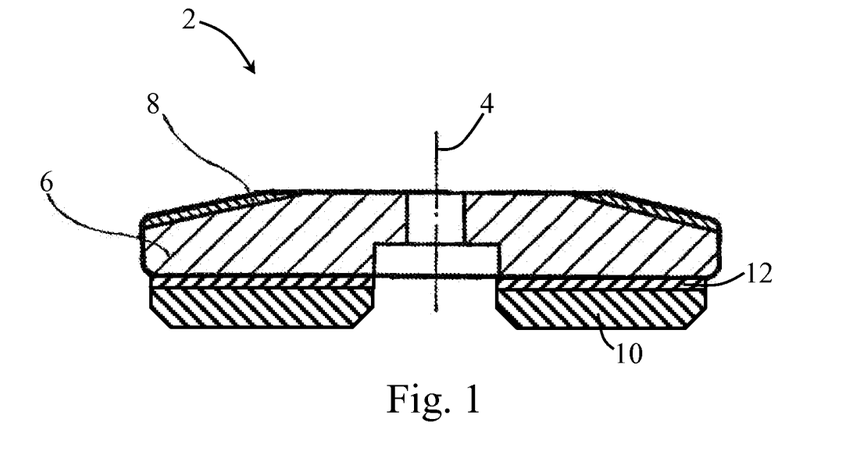
FIG. 1: a schematic depiction of a rotary X-ray anode in cross-sectional view.

FIG. 1 schematically shows the structure of an embodiment of a rotary X-ray anode -2-. The rotary X-ray anode -2- is rotationally symmetric about a rotational axis of symmetry -4-. The rotary X-ray anode -2- has a plate-like base body -6- which can be mounted on an appropriate shaft. At the top, an annular focal track coating -8- is applied to the base body -6-. The section over which the annular focal track coating -8- extends has the shape of a frust
rum of a cone (a flat cone). The focal track coating -8- covers at least the region of the base body -6- on which an electron beam impinges during use. On the rear side and opposite the focal track coating -8-, the base body -6- is joined over its area to a radiative body -10-. The base body -6- is joined to the radiative body -10- via a bonding solder layer -12- so that the total arrangement forms an embodiment of a high-temperature-resistant composite body according to the invention. In the present embodiment, the base body -6- is formed by formed TZM and the radiative body -10- is formed by graphite. The radiative body -10- is joined via a first soldered bond formed by a Zr solder to an intermediate layer composed of pure Ta (to an extent of at least 98 atom % of Ta). The intermediate layer is joined via a second soldered bond formed by a Ti—V solder combination to the base body -6-.

Figure 2:
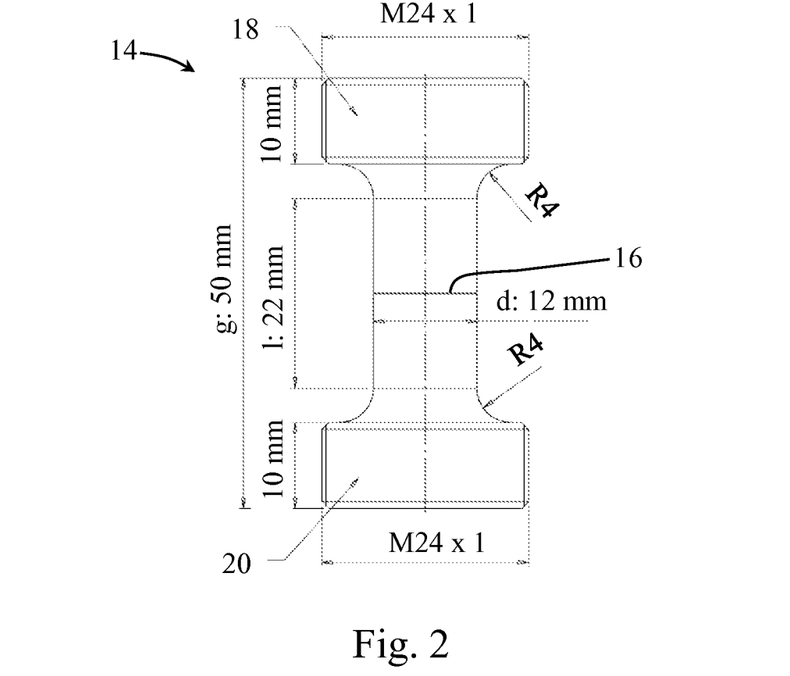
FIG. 2: a schematic depiction of a tensile specimen with the associated dimensions.

The measurement method which can be employed for determining the remelting temperature is described in general terms below. Here, it has to be taken into account that the remelting temperature determined by this measurement method typically has fluctuations in a range of +/−20° C. Firstly, a tensile specimen -14- whose direction of extension runs perpendicular to the plane of the bonding solder layer -16- to be examined and in which the bonding solder layer -16- is arranged centrally is machined from the soldered composite body. The relevant dimensions of the tensile specimen -14- are shown in FIG. 2, with the dimensions in millimeters being indicated. Significant parameters of the dimensions are, in particular, the diameter -d- of the circular cross section in the central region of the tensile specimen of 12 mm, which is constant over a length -l- of 22 mm. The total length -g- of the tensile specimen -14- is 50 mm, with the end sections -18-, -20- having an enlarged, circular cross section. For fastening during carrying out of the tensile test, external threads, which in the present case are formed by a metric M24 thread (i.e. 24 mm external diameter) having a pitch of 1, are provided on the end sections -18-, -20-.

The tensile specimen is installed in a hot tensile furnace and a constant initial force of 90 N (N: newton) is applied. Owing to the diffusion effects occurring at high temperatures, which can influence the result of the measurement of the remelting temperature, the temperature is increased very quickly at a heating rate of 50° C./min (min: minute) to 50° C. below the expected remelting temperature. At an assumed remelting temperature of 1650° C., the tensile specimen should, for example, be heated at this high heating rate to a furnace temperature of 1600° C. After a hold time of 10 min, which serves to heat the tensile specimen all through, the temperature is then increased further at a significantly lower heating rate of 5° C./min (min: minute). During this increase, the point in time at which a decrease in the initial force applied to the tensile specimen to zero (0 N) or essentially to zero occurs is measured and the furnace temperature measured at this point in time is determined as definitive value for the remelting temperature. If the tensile specimen has been maintained for 60 minutes at a furnace temperature of above 1000° C. and the remelting temperature has not yet been reached, the experiment using this tensile specimen is stopped since otherwise the diffusion effects would influence the measured result to an excessive extent. A new experiment using a new tensile specimen is then started, with heating being carried out at the high heating rate to an appropriately higher temperature value, and the experiment is then carried out in a corresponding manner.

Since the temperature measurement in a high vacuum at temperatures above 1000° C. can have large inaccuracies, it is advantageous to calibrate the test system using a tensile specimen which has a constantly measurable melting point. A Zr-soldered tensile specimen (having the dimensions indicated above) having only one soldered bond formed by a Zr solder which adjoins, on at least one side, a section composed of Mo or an Mo-based alloy (the other side of the soldered Zr bond adjoins a section composed of graphite) is therefore installed in the hot tensile furnace and measured by the above-described measurement method. Owing to the (very reliable) formation of a eutectic of Zr with Mo, a melting point of 1550° C. is assumed. If this melting point can be confirmed by means of the measurement (i.e. the measured melting point is in the range of +/−25° C. about the expected melting point of 1550° C.), the existing temperature measurement is acceptable. Otherwise, the temperature measurement has to be adapted accordingly until this expected melting point can be verified. As an alternative, another calibration method of equivalent value can also be used for determining the correct temperature within the hot tensile furnace.

Figure 5:
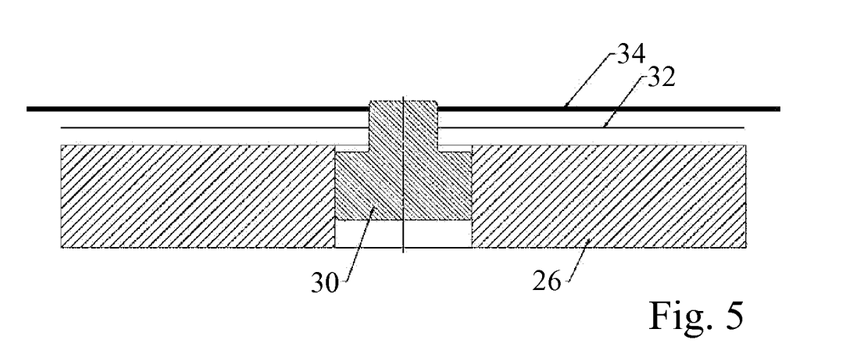
FIG. 5: a schematic depiction in cross-sectional view to illustrate the first soldering step of an embodiment of the present invention.
Figure 6:
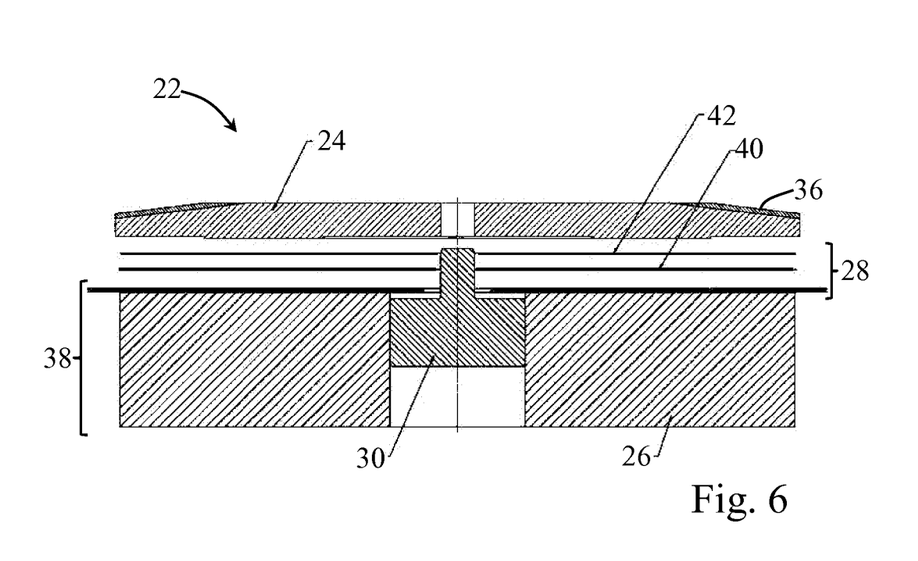
FIG. 6: a schematic depiction in cross-sectional view to illustrate the second soldering step.

An example for producing a composite body according to the invention, which is formed by a rotary X-ray anode -22-, is described below with reference to FIGS. 5 and 6. In the example, a base body -24- formed by TZM is joined over its area via a bonding solder layer -28- to a radiative body -26- formed by graphite. The graphite radiative body -26- is firstly provided with structuring, in particular a groove structure, by machining on the surface to be joined. The groove structure has a depth of about 350 μm. Thermal shock purification and heat treatment in a high vacuum of the graphite radiative body -26- is subsequently carried out. Furthermore, a centring adapter -30- composed of graphite is provided so as to serve for centring of the components during soldering. A 1 mm thick Ta solder foil (at least 98 atom % of Ta) and a 0.2 mm thick Zr solder foil (at least 95 atom % of Zr) are cut to size by means of laser cutting and subjected to ultrasonic cleaning. The graphite radiative body -26-, the Zr solder foil -32- and the Ta solder foil -34- are subsequently placed on top of one another in this order to produce the first arrangement (cf. FIG. 5), with the centring adapter -30- serving for centring of the layers. The first arrangement is subjected to a first soldering step in a high-vacuum furnace. Here, the first arrangement is firstly heated to 1600° C. at an average heating rate in the range from 10° C./min to 20° C./min (min: minute), in particular at a heating rate of 15° C./min, under a high vacuum. At 1600° C., a hold time in the range from 10 to 20 minutes (in particular 15 minutes) is applied in order to ensure heating all through of the components. The temperature is subsequently increased at a heating rate in the range from 10° C./min to 20° C./min (min: minute), in particular at a heating rate of 15° C./min, to a maximum temperature of 1915° C. After the temperature of 1915° C. has been reached, a renewed hold time (at this temperature) in the range from 5 to 10 minutes (in particular 8 minutes) is applied. The first arrangement is then cooled slowly in a high vacuum to room temperature within the furnace. The part composite body -38- obtained in this way is subjected to non destructive testing (ultrasonic testing).

The base body -24-, on the upper side of which a focal track coating -36- is provided in the embodiment depicted, is machined and subsequently subjected to ultrasonic cleaning. In the present embodiment, the Ta intermediate layer of the part composite body -38- is also machined to set a desired thickness of the Ta intermediate layer. The part composite body 38 is subsequently also subjected to ultrasonic cleaning. To prepare for the second soldering step, a new centring adapter 30 is made (if necessary). To provide a Ti—V solder combination, a 0.1 mm thick V solder foil (at least 98 atom % of V) and a 0.25 mm thick Ti solder foil (at least 98 atom % of Ti) are cut to size by means of laser cutting and subsequently subjected to ultrasonic cleaning. The part composite body -38-, the Ti solder foil -40-, the V solder foil -42- and the base body -24- are subsequently placed on top of one another in this order to produce the second arrangement (cf. FIG. 6), with the centring adapter -30- serving to centre the layers. The second arrangement is subjected to a second soldering step in a high vacuum in a high vacuum furnace. Here, the second arrangement is firstly heated to 1500° C. at an average heating rate in the range from 20° C./min to 40° C./min (min: minute), in particular at a heating rate of 30° C./min. At 1500° C., a hold time in the range from 10 to 20 minutes (in particular 15 minutes) is applied in order to ensure heating all through of the components. The temperature is subsequently increased at a heating rate in the range from 10° C./min to 30° C./min (min: minute), in particular at a heating rate of 20° C./min, to a maximum temperature of 1650° C. After the temperature of 1650° C. has been reached, a renewed hold time (at this temperature) in the range from 5 to 10 minutes (in particular 8 minutes) is applied. The composite body obtained is then slowly cooled to room temperature in a high vacuum within the high vacuum furnace. The composite body obtained is subjected to nondestructive testing (ultrasonic testing).

The production process described can be carried out correspondingly when another one of the above-described intermediate layers is used instead of the Ta intermediate layer. Furthermore, other materials which are described in general terms above can also be used for the second solder; depending on the material used, the melting point to be expected within the second arrangement should be estimated and the maximum temperature during the second soldering step adapted accordingly.

Particularly preferred materials for the second solder are, in particular, a Ti solder, a Ti—V solder combination, a Zr solder and a Zr—Ti solder combination.

In the case of these materials, a particularly low melting point is achieved, as described in detail below, with this applying at least within particular composition ranges for the solder combinations mentioned. In this way, thermal ageing of the second, metallic section can be largely avoided.

Figure 3:
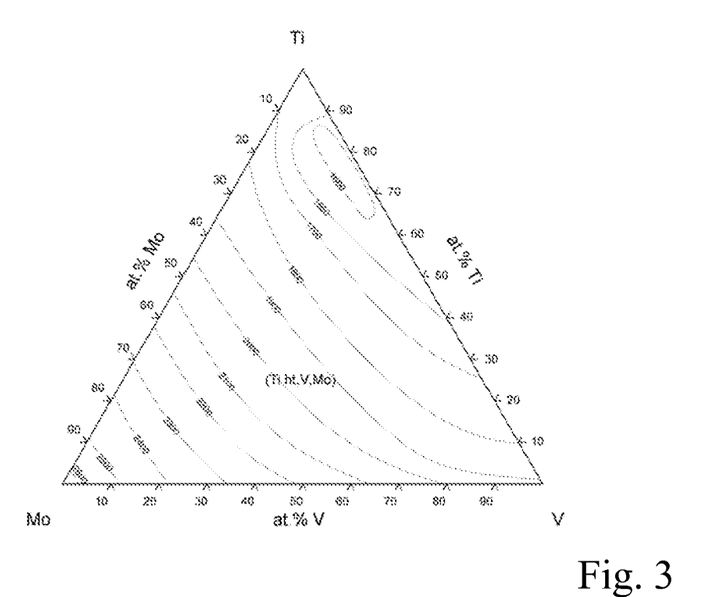
FIG. 3: a phase diagram of the ternary system Ti—V—Mo.
Figure 4:
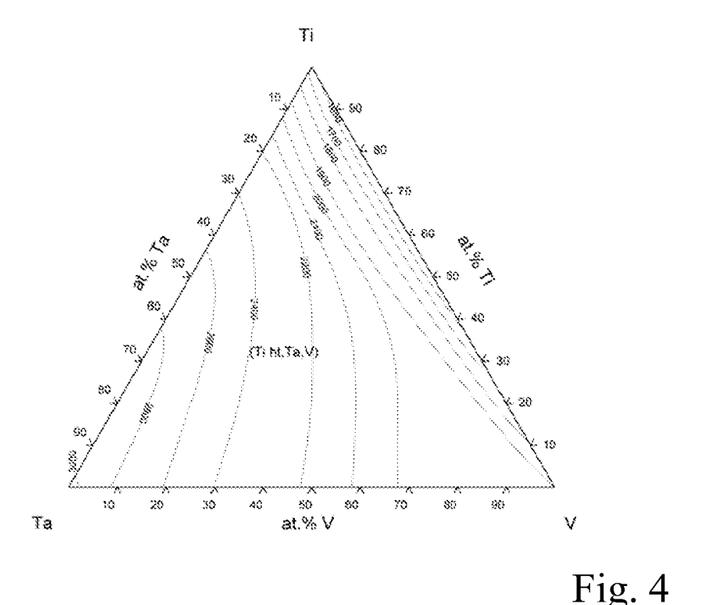
FIG. 4: a phase diagram of the ternary system Ti—V—Ta.

The one group of preferred materials is formed by a Ti solder having a melting point of 1670° C. and a Ti—V solder combination having a melting point minimum of 1600° C. at a composition of 31 atom % of V and 69 atom % of Ti. However, comparatively low melting points of the Ti—V solder combination are achieved over a comparatively wide composition range of 20-40 atom % of V. This relationship can also be seen in the two phase diagrams depicted in FIGS. 3 and 4 of the ternary systems Ti—V—Mo (FIG. 3) and Ti—V—Ta (FIG. 4). Furthermore, it can also be seen from the phase diagrams of FIGS. 3 and 4 that increasing diffusion of Mo and/or Ta into the solder concerned (Ti solder or Ti—V solder combination) brings about a correspondingly increasing increase in the melting point of the second solder (also applies correspondingly in the case of an Nb intermediate layer). Accordingly, a Ti solder and a Ti—V solder combination make it possible for the second soldering step to be carried out at a comparatively low furnace temperature. In particular, maximum furnace temperatures in the range from 1600° C. to 1720° C., depending on the selected temperature safety margin relative to the melting point (typically 50° C. above the melting point to be expected), are suitable for the second soldering step in order to ensure melting of the solder. Furthermore, these solders make it possible, owing to the diffusion effects described, for the soldered bond obtained there from to withstand comparatively high use temperatures.

The other group of preferred materials is formed by a Zr solder and a Zr—Ti solder combination. Owing to the above-described diffusion effects, a eutectic of Zr and Mo having a melting point of 1550° C. is reliably formed when these solders are arranged directly next to a second section composed of Mo or an Mo alloy. If a Zr—Ti solder combination is used, it is possible to work in the region of the melting point minimum of about 1554° C. of this solder combination. In particular, maximum furnace temperatures in the range from 1550° C. to 1630° C. are suitable, depending on the selected temperature safety margin relative to the melting point (typically 50° C. above the melting point to be expected), for ensuring melting of the solder in the second soldering step. Accordingly, particularly low soldering temperatures are possible for the second soldering step in the case of these solders. Depending on the materials, the thermal stress ability can sometimes be somewhat lower than in the case of the Ti solder and the Ti—V solder combination described above.

Furthermore, it has to be taken into account that in the case of a Ti—V solder combination formed by two solder foils for the second solder, preference is given to the Ti solder foil adjoining the intermediate layer.

The invention claimed is:

1. A process for producing a high-temperature-resistant composite body, the process comprising:
   A) producing a first assembly of a first, nonmetallic section, a first Zr solder, and an intermediate layer in sequence, the intermediate layer being formed to at least 90 atom % of one or more of the elements selected from the group consisting of Ta, Nb, and W;
   B) heating the first assembly in a first soldering step to melt the Zr solder but not the intermediate layer and to obtain a partial composite body;
   C) producing a second assembly of the partial composite body, a second solder adjoining the intermediate layer of the partial composite body and a second, metallic section in sequence, where the second section is composed of a metal selected from the group consisting of Mo, a Mo-based alloy, W, and a W-based alloy, and where the second solder is formed by precisely one material selected from the group consisting of Ti, a Ti-based solder combination, a V-based solder combination, Zr and a Zr-based solder combination, and the second solder configured to melt at a lower temperature than the first Zr solder in the second assembly; and
   D) heating the second assembly in a second soldering step to melt the second solder but not the soldered bond obtained from the first Zr solder;
   to areally join the first, nonmetallic section via the bonding solder layer to the second, metallic section and to form the high-temperature-resistant composite body.

2. The process according to claim 1, which comprises carrying out the second soldering step with a maximum furnace temperature that is at least 100° C. lower than a maximum furnace temperature reached in the first soldering step.

3. The process according to claim 1, which comprises setting a maximum furnace temperature in the first soldering step within a range from 1800° C. inclusive to 2000° C. inclusive, and setting a maximum furnace temperature in the second soldering step within a range from 1550° C. inclusive to 1720° C. inclusive.

4. The process according to claim 1, which comprises selecting a material of the second solder to have a melting point in a range from 1550° C. inclusive to 1680° C. inclusive in the second assembly.

5. The process according to claim 1, wherein the second solder is formed by precisely one of the following solders:
a Ti solder;
a Ti—V solder combination;
a Zr solder; or
a Zr—Ti solder combination.

6. The process according to claim 1, wherein the second solder is a Ti—V solder combination having a proportion of from 12 atom % inclusive to 50 atom % inclusive of V, and a balance Ti.

7. The process according to claim 1, which comprises machining a surface of the intermediate layer of the partial composite body prior to step producing the second assembly.

8. The process according to claim 1, which comprises forming the intermediate layer with an average thickness in a range from 0.1 mm inclusive to 2 mm inclusive.

9. The process according to claim 1, wherein an average thickness of the first solder is in a range from 80 μm inclusive to 500 μm inclusive and the average thickness of the second solder is in the range from 30 μm inclusive to 400 μm inclusive.

10. The process according to claim 1, wherein the first section is formed of a C-based material and the second section is formed of Mo or an Mo-based alloy.

11. The process according to claim 1, wherein the first section is formed of a ceramic.

12. The process according to claim 1, wherein the first section and the second section each form sections of components of an X-ray anode.

13. A high-temperature-resistant composite body, comprising:
a first, nonmetallic section joined, via a bonding solder layer, to a second, metallic section composed of a material selected from the group consisting of Mo, an Mo-based alloy, W and a W-based alloy;
said bonding solder layer including a first soldered bond formed by a Zr solder joining said first section to an intermediate layer which, at least in a core region, is formed to an extent of at least 90 atom % by at least one of the elements selected from the group consisting of Ta, Nb, and W; and
said bonding solder layer including a second soldered bond formed by a solder selected from the group consisting of a Ti solder, a Ti—V solder combination, a Zr solder, and a Zr—Ti solder combination joining said intermediate layer to said second section.

14. The composite body according to claim 13, wherein said second soldered bond comprises a Ti solder having a remelting temperature of not more than 1860° C.

15. The composite body according to claim 13, wherein said second soldered bond comprises a Ti—V solder combination having a remelting temperature of not more than 1780° C.

* * * * *